US012636867B2

(12) United States Patent
Wang et al.

(10) Patent No.: US 12,636,867 B2
(45) Date of Patent: May 26, 2026

(54) BIAXIALLY ORIENTED POLYPROPYLENE-BASED MULTILAYER FILM

(71) Applicant: Borealis AG, Vienna (AT)

(72) Inventors: Jingbo Wang, Linz (AT); Markus Gahleitner, Linz (AT); Klaus Bernreitner, Linz (AT); Pauli Leskinen, Porvoo (FI); Peter Niedersuess, Linz (AT); Stefan Ortner, Linz (AT)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 18/284,143

(22) PCT Filed: Mar. 30, 2022

(86) PCT No.: PCT/EP2022/058467
§ 371 (c)(1),
(2) Date: Sep. 26, 2023

(87) PCT Pub. No.: WO2022/207737
PCT Pub. Date: Oct. 6, 2022

(65) Prior Publication Data

US 2024/0100816 A1 Mar. 28, 2024

(30) Foreign Application Priority Data

Apr. 1, 2021 (EP) .................................... 21166736

(51) Int. Cl.
*B32B 27/32* (2006.01)
*B32B 7/02* (2019.01)
*B32B 7/035* (2019.01)
*B32B 27/08* (2006.01)

(52) U.S. Cl.
CPC .............. *B32B 27/327* (2013.01); *B32B 7/02* (2013.01); *B32B 7/035* (2019.01); *B32B 27/08* (2013.01); *B32B 2250/02* (2013.01); *B32B 2250/242* (2013.01); *B32B 2323/10* (2013.01)

(58) Field of Classification Search
CPC . C08F 10/06; B32B 1/02; B32B 27/32; Y10T 428/1352; Y10T 428/31855; B65D 88/00
USPC ........... 428/35.7, 500, 516, 62.22; 220/62.22
See application file for complete search history.

(56) References Cited

U.S. PATENT DOCUMENTS

| | | | | |
|---|---|---|---|---|
| 2009/0118451 A1* | 5/2009 | Fuchs | C08F 210/06 526/351 |
| 2009/0163678 A1* | 6/2009 | Kiss | C08F 210/16 526/348 |
| 2015/0025209 A1* | 1/2015 | Canich | C08F 110/06 556/11 |
| 2016/0121580 A1* | 5/2016 | Grazzi | B32B 27/32 428/516 |
| 2016/0122449 A1* | 5/2016 | Wang | C08L 23/142 526/123.1 |
| 2020/0056028 A1 | 2/2020 | Van Houcke | |
| 2021/0214478 A1 | 7/2021 | Wang et al. | |
| 2021/0283812 A1 | 9/2021 | Ruiz | |

FOREIGN PATENT DOCUMENTS

| | | | |
|---|---|---|---|
| EP | 1243612 | A2 | 9/2002 |
| EP | 1462246 | A1 | 9/2004 |
| EP | 0887379 | B1 | 12/2004 |
| EP | 1588843 | A1 | 10/2005 |
| EP | 2622013 | A1 | 8/2013 |
| EP | 2540499 | B1 | 2/2014 |
| EP | 2808352 | A1 | 12/2014 |
| EP | 2810773 | A1 | 12/2014 |
| EP | 2853563 | A1 | 4/2015 |
| EP | 2965908 | A1 | 1/2016 |
| EP | 3064514 | A1 | 9/2016 |
| EP | 3064515 | A1 | 9/2016 |
| EP | 3064548 | A1 | 9/2016 |
| EP | 3738765 | | 11/2020 |
| EP | 3738765 | A1 | 11/2020 |
| EP | 3967716 | A1 | 3/2022 |
| RU | 2733454 | C1 | 10/2020 |
| TW | 200920597 | A * | 5/2009 |
| WO | 9212182 | A1 | 7/1992 |
| WO | 9414856 | A1 | 7/1994 |
| WO | 9512622 | A1 | 5/1995 |
| WO | 9924478 | A1 | 5/1999 |
| WO | 9924479 | A1 | 5/1999 |
| WO | 0068315 | A1 | 11/2000 |
| WO | 02057342 | A3 | 10/2002 |
| WO | 2004000899 | A1 | 12/2003 |
| WO | 2006097497 | A1 | 9/2006 |
| WO | 2012044732 | A1 | 4/2012 |
| WO | 2013007650 | A1 | 1/2013 |
| WO | 2013009650 | A1 | 1/2013 |
| WO | 2015158790 | A2 | 10/2015 |

(Continued)

OTHER PUBLICATIONS

Decision to Grant in English for Russian Patent Aplication No. 2023127311/05 dated Dec. 6, 2023, 15 pages.
Russian Search Report for Russian Patent Application No. 2023127311/05 dated Nov. 5, 2023, 2 pages.
Office Action for European Patent Application No. 22719575.7 dated Oct. 8, 2024, 5 pages.
International Search Report and Written Opinion for PCT/EP2022/058467 mailed Jun. 30, 2022, 14 pages.
European Search Report for EP21166736.5 dated Aug. 25, 2021, 7 pages.
Notification of Transmittal of the International Preliminary Report on Patentability for PCT/EP2022/058467 mailed Feb. 21, 2023, 15 pages.

(Continued)

*Primary Examiner* — Aaron Austin
(74) *Attorney, Agent, or Firm* — Lowenstein Sandler LLP

(57) ABSTRACT

Polypropylene-based multilayer film, which is biaxially oriented, a process for manufacturing the biaxially oriented multilayer film and its use in flexible packaging.

17 Claims, No Drawings

(56) References Cited

FOREIGN PATENT DOCUMENTS

| | | | |
|---|---|---|---|
| WO | WO-2016162359 | A1 * | 10/2016 |
| WO | 2018122134 | A1 | 7/2018 |
| WO | 2018211107 | A1 | 11/2018 |
| WO | 2019179959 | A1 | 9/2019 |
| WO | 2019197384 | A1 | 10/2019 |
| WO | 2020020825 | A1 | 1/2020 |
| WO | WO-2020002349 | A1 * | 1/2020 |
| WO | 2020114769 | A2 | 6/2020 |
| WO | 2020239561 | A1 | 12/2020 |
| WO | 2020239583 | A1 | 12/2020 |
| WO | 2021063974 | A1 | 4/2021 |
| WO | 2021063975 | A1 | 4/2021 |
| WO | 2021110615 | A1 | 6/2021 |
| WO | 2021233772 | A1 | 11/2021 |
| WO | 2022043385 | A1 | 3/2022 |
| WO | 2022053475 | A1 | 3/2022 |

OTHER PUBLICATIONS

Singh, et al., "Triad Sequence Determination of Ethylene-Propylene Copolymers—Application of Quantitative 13C NMR," Polymer Testing, 2009, vol. 29, pp. 475-479.

Zhou, Z., Kuemmerle, R., Qiu, X., Redwine, D., Cong, R., Taha, A., Baugh, D. Winniford, B., J. Mag. Reson. 187 (2007) 225.

Busico, V., Carbonniere, P., Cipullo, R., Pellecchia, R., Severn, J., Talarico, G., Macromol. Rapid Commun. 2007, 28, 1128.

Resconi, L. Cavallo, A. Fait, F. Piemontesi, Chem. Rev. 2000, 100 (4), 1253, in Cheng, H. N., Macromolecules 1984, 17, 1950.

Wang, et al., "Structural Analysis of Ethylene/Propylene Copolymers Synthesized with a Constrained Geometry Catalyst," Macromolecules, 2000, vol. 33, pp. 1157-1162.

Kakugo, et al., "C NMR Determination of Monomer Sequence Distribution in Ethylene-Propylene Copolymers Prepared with s—TiCL13—AL (C2H5)2C1," Macromolecules, 1982, vol. 15, pp. 1150-1152.

Third Party Observation for PCT/EP2022/058467 dated Jul. 24, 2023, 2 pages.

* cited by examiner

BIAXIALLY ORIENTED POLYPROPYLENE-BASED MULTILAYER FILM

CROSS-REFERENCE TO RELATED APPLICATION(S)

The present application is a national stage entry under 35 U.S.C. § 371 of International Application No. PCT/EP2022/058467, filed on Mar. 30, 2022, which claims priority to European Patent Application No. 2116673.5, filed on Apr. 1, 2021. The contents of these applications are hereby incorporated by reference in their entirety.

FIELD OF THE INVENTION

The present invention relates to a polypropylene-based multilayer film, which is biaxially oriented, a process for manufacturing the biaxially oriented multilayer film and to its use in flexible packaging.

BACKGROUND

Polypropylene-based resins have been widely used in the food packaging field because they have excellent tensile strength, rigidity, transparency and the like, and are additionally advantageous due to their non-toxicity and odorlessness. Generally, they are used in the form of cast films (CPP) or biaxially oriented films (BOPP) or water-quenched tubular films (TQPP). Biaxially oriented polypropylene (BOPP) films are films stretched in both machine and transverse directions, producing molecular chain orientation in two directions.

Biaxially oriented polypropylene-based (BOPP) multilayer films are commonly used in packaging industry, including food packaging.

Typically, this application comprises a sealing layer, which provides the necessary sealing performance. However, such a sealing layer is directly in contact with the food packed, therefore the cleanness, e.g. low content of extractables, is very important.

Films for food packaging are typically transparent, or more general, shall furthermore have good optical properties, like low haze to provide an attractive appearance.

The state of art technology is based on the Ziegler-Natta technology, the sealing layer is typically a Ziegler-Natta catalysed propylene-ethylene-butene terpolymer. In the last decades this solution served the needs. Due the change of market requirements, such terpolymers somehow reached their limit, e.g. the sealing imitation temperature is not low enough, optics are not as good as required, etc.

Other polypropylenes than propylene-ethylene-butene terpolymers for the sealing layers are also in general known.

For example, EP 2965908 discloses a $C_3C_2$ random copolymer produced in a Borstar pilot plant with a 2-reactor set-up (loop-gas phase reactor (GPR 1) in the presence of a Ziegler-Natta catalyst and subsequent visbreaking (IE2). The final $C_3C_2$ random copolymer has an $MFR_2$ (230° C./2.16 kg) measured according to ISO 1133 of 5.4 g/10 min, n ethylene content of 6.8 wt % and a melting temperature of 135° C.

In EP 2965908 only unoriented monolayer cast films have been prepared.

EP 3064514 discloses $C_3C_2$ random copolymer compositions produced in a Borstar pilot plant with a 3-reactor set-up (loop-gas phase reactor (GPR 1)-gas phase reactor (GPR 2) in the presence of a metallocene catalyst.

The final $C_3C_2$ random copolymers have an $MFR_2$ (230° C./2.16 kg) measured according to ISO 1133 of ~7.0 to 7.6 g/10 min, an ethylene content of 4.6, respectively 4.7 wt % and a melting temperature of ~136° C.

Also in EP 3064514 only unoriented monolayer cast films have been prepared. Again, no BOPP multilayer films are were prepared, and the orientation process is commonly known to raise the sealing temperature.

As mentioned above, BOPP multilayer films are widely used in packaging. The key requirements are sealing properties, optical properties, like haze, and low extractable content. Thus, there is still the need for BOPP multilayer films having a very good sealing behaviour, low haze and low extractable content.

Therefore, it was one objective of the present invention to provide a new type of BOPP multilayer films with improved sealing properties, like low sealing initiation temperature (SIT) and sufficient seal strength.

Another problem is the recycling of BOPP multilayer films after their first use. It is much more challenging to recycle BOPP multilayer films made of different materials, e.g. different kinds of polymers, like e.g. polyamide or polyester and polypropylene, than to recycle mono-material solutions. On the other hand, the use of different materials often is necessary to obtain acceptable properties, like sealing properties and mechanical properties. Therefore, another objective of the present invention is the provision of a polypropylene based mono-material solution, which shows a good sealing behaviour.

SUMMARY OF THE INVENTION

The present invention is therefore related to a biaxially oriented polypropylene-based multilayer film comprising at least a core layer (CL), a first outer layer (OL1) and a second outer layer (OL2), wherein,

- the first and the second outer layers (OL1) and (OL2) comprise a metallocene produced propylene-ethylene random copolymer having
  - a melt flow rate $MFR_2$ (230° C./2.16 kg) measured according to ISO 1133 in the range from 2 to 10 g/10 min;
  - a melting temperature $T_m$ as determined by DSC according to ISO 11357 in the range from 115 to 135° C.; and
  - an ethylene content in the range from 2.0 to 5.0 wt % based on the weight of the propylene-ethylene random copolymer; and wherein
- the core layer (CL) is a polypropylene-based layer.

Unexpectedly, the biaxially oriented polypropylene-based multilayer film of the invention provides improved sealing properties, such as especially low sealing initiation temperature (SIT) in combination with good seal strength and low haze.

Definitions

Where the term "comprising" is used in the present description and claims, it does not exclude other non-specified elements of major or minor functional importance. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

Metallocene produced propylene-ethylene random copolymer is defined in this invention as propylene-ethylene random copolymer, which has been produced in the presence of a metallocene catalyst.

Polypropylene-based layer is defined in this invention as layer, which is made of polypropylene polymers only, i.e. polymers other than polypropylenes are substantially absent.

Regio Defects

The region defects of propylene polymers can be of three different types, namely 2,1-erythro (2,le), 2,1-threo (2,lt) and 3,1 defects. A detailed description of the structure and mechanism of formation of regio defects in polypropylene can be found in Chemical Reviews 2000, 100(4), pages 1316 to 1327. These defects are measured using $^{13}$C NMR as described in more detail below.

The term "2,1 regio defects" as used in the present invention defines the sum of 2,1-erythro regio-defects and 2,1-threo regio defects. Propylene random copolymers or polypropylene homopolymers having a number of regio defects as required in the propylene composition of the invention are usually and preferably prepared in the presence of a single-site catalyst.

The catalyst influences in particular the microstructure of the polymer. Accordingly, polypropylenes prepared by using a metallocene catalyst provide a different microstructure compared to those prepared by using Ziegler-Natta (ZN) catalysts. The most significant difference is the presence of regio-defects in metallocene-made polypropylenes, which is not the case for polypropylenes made by Ziegler-Natta (ZN) catalysts.

It is also understood within the meaning of this disclosure that the below described embodiments may be combined.

DETAILED DESCRIPTION

According to the present invention, the multilayer film comprises a first and the second outer layers (OL1) and (OL2), which comprise a metallocene produced propylene-ethylene random copolymer.

Metallocene Produced Propylene-ethylene Random Copolymer

The a metallocene produced propylene-ethylene random copolymer is characterized by a melt flow rate MFR$_2$ (230° C./2.16 kg) measured according to ISO 1133 in the range from 2 to 10 g/10 min, preferably from 3 to 8 g/10 min, more preferably from 4 to 7 g/10 min;

a melting temperature T$_m$ as determined by DSC according to ISO 11357 in the range from 115 to 135° C., preferably 117 to 133° C., more preferably 120 to 131° C.; and an ethylene content in the range from 2.0 to 5.0 wt %, preferably 2.5 to 4.5 wt %, based on the weight of the propylene-ethylene random copolymer.

One preferred embodiment of the present invention stipulates that the propylene-ethylene random copolymer additionally has one or both of the following characteristics:

a hexane extractables content as measured according to the FDA test of less than 2.0 wt %, preferably in the range of 0.1 to less than 1.5 wt %, more preferably of 0.2 to less than 1.0 wt %, and even more preferably in the range of 0.3 to 0.9 wt %;

a number of 2,1 and 3,1 regio defects as measured by $^{13}$C NMR in the range from 0.10 to 1.0 mol %, preferably from 0.20 to 0.80 mol % and more preferably from 0.30 to 0.50 mol %.

In still a further preferred embodiment of the present invention, the propylene-ethylene random copolymer has a crystallization temperature T$_c$ as determined by DSC according to ISO 11357 in the range from 75 to 110° C., preferably 80 to 105° C.

Another preferred embodiment of the present invention stipulates that the propylene-ethylene random copolymer has a xylene cold soluble (XCS) fraction as determined according to ISO 16152 of from 0.1 to below 15.0 wt %, preferably from 0.3 to 5.0 wt %, more preferably from 0.5 to 3.0 wt %, based on the weight of the propylene-ethylene random copolymer.

According to a further preferred embodiment of the present invention the random propylene-ethylene copolymer comprises, or consists of, two polymer fractions (RACO-1) and (RACO-2) and the split between fractions (RACO-1) and (RACO-2) is preferably from 30:70 to 70:30, more preferably the fraction (RACO-1) is present in an amount of from 50.0 to 70.0 wt %, even more preferably from 55.0 to 65.0 wt %, based on the total propylene-ethylene random copolymer, and the fraction (RACO-2) is thus preferably present in an amount of from 30.0 to 50.0 wt %, and even more preferably from 35.0 to 45.0 wt %, based on the total propylene-ethylene random copolymer.

Optionally, a small fraction of prepolymer, usually below 5.0 wt %, based on the total propylene-ethylene random copolymer, may also be present in the random propylene-ethylene copolymer.

Still another embodiment in accordance with the present invention stipulates that the fraction (RACO-1) of the propylene-ethylene random copolymer has an ethylene content in the range of 1.5 to 5.5 wt %, preferably of 2.0 to 5.0 wt % and more preferably of 2.5 to 4.0 wt %, and/or the fraction (RACO-2) has an ethylene content in the range of 3.0 to 8.0 wt %, preferably of 3.5 to 7.0 wt % and more preferably of 4.0 to 6.5 wt %.

The ethylene content of fraction (RACO-1) is preferably lower than the ethylene content of fraction (RACO-2).

Furthermore, it is preferred that fraction (RACO-1) has a melt flow rate MFR$_2$ (230° C./2.16 kg) measured according to ISO 1133 in the range of from 2.5 to 15.0 g/10 min, more preferably from 3.0 to 10.0 g/10 min and even more preferably from 4.0 to 8.0 g/10 min, and/or that fraction (RACO-2) has a melt flow rate MFR$_2$ (230° C./2.16 kg) measured according to ISO 1133 in the range of from 2.0 to 12.0 g/10 min, more preferably 3.0 to 10.0 g/10 min and even more preferably from 3.5 to 8.0 g/10 min.

Another preferred embodiment of the present invention stipules that the propylene-ethylene random copolymer is produced in the presence of a metallocene catalyst, which is preferably a metallocene catalyst comprising a complex in any one of the embodiments as described in WO 2013/007650 A1, WO 2015/158790 A2, WO 2018/122134 A1 or WO2019/179959.

Preferred complexes for the preparation of the propylene-ethylene random copolymer are for example described in WO 2019179959.

More preferred complexes are of formula (I)

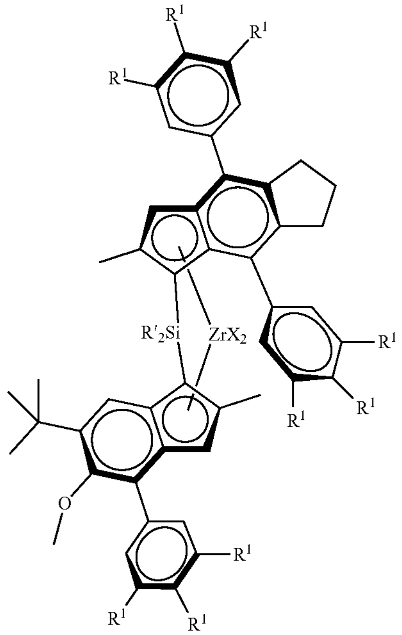

wherein each $R^1$ are independently the same or can be different and are hydrogen or a linear or branched $C_1$-$C_6$-alkyl group, whereby at least on $R^1$ per phenyl group is not hydrogen, R' is a $C_1$-$C_{10}$ hydrocarbyl group, preferably a $C_1$-$C_4$ hydrocarbyl group and more preferably a methyl group and X independently is a hydrogen atom, a halogen atom, $C_1$-$C_6$ alkoxy group, $C_1$-$C_6$ alkyl group, phenyl or benzyl group.

Most preferably, X is chlorine, benzyl or a methyl group. Preferably, both X groups are the same. The most preferred options are two chlorides, two methyl or two benzyl groups, especially two chlorides.

Specific preferred metallocene catalyst complexes of the invention include:

rac-anti-dimethylsilanediyl[2-methyl-4,8-bis-(4"-tert-butylphenyl)-1,5,6,7-tetrahydro-s-indacen-1-yl][2-methyl-4-(3',5'-dimethyl-phenyl)-5-methoxy-6-tert-butylinden-1-yl] zirconium dichloride rac-anti-dimethylsilanediyl[2-methyl-4,8-bis-(3',5'-dimethylphenyl)-1,5,6,7-tetrahydro-s indacen-1-yl] [2-methyl-4-(3',5'-dimethylphenyl)-5-methoxy-6-tert-butylinden-1-yl] zirconium dichloride rac-anti-dimethylsilanediyl[2-methyl-4,8-bis-(3',5'-dimethylphenyl)-1,5,6,7-tetrahydro-s-indacen-1-yl][2-methyl-4-(3',5'-ditert-butyl-phenyl)-5-methoxy-6-tert-butylinden-1-yl] zirconium dichloride or their corresponding zirconium dimethyl analogues.

In another preferred embodiment of the present invention a cocatalyst system comprising a boron containing cocatalyst, e.g. a borate cocatalyst and an aluminoxane cocatalyst is used.

The catalyst can be used in supported or unsupported form, preferably in supported form. The particulate support material used is preferably an organic or inorganic material, such as silica, alumina or zirconia or a mixed oxide such as silica-alumina, in particular silica, alumina or silica-alumina. The use of a silica support is preferred. The skilled person is aware of the procedures required to support a metallocene catalyst.

Especially preferably, the support is a porous material so that the complex may be loaded into the pores of the support, e.g. using a process analogous to those described in WO94/14856 (Mobil), WO95/12622 (Borealis) and WO2006/097497.

The average particle size of the silica support can be typically from 10 to 100 μm. However, it has turned out that special advantages can be obtained if the support has an average particle size from 15 to 80 μm, preferably from 18 to 50 μm.

The average pore size of the silica support can be in the range 10 to 100 nm and the pore volume from 1 to 3 mL/g.

Examples of suitable support materials are, for instance, ES757 produced and marketed by PQ Corporation, Sylopol 948 produced and marketed by Grace or SUNSPERA DM-L-303 silica produced by AGC Si-Tech Co. Supports can be optionally calcined prior to the use in catalyst preparation in order to reach optimal silanol group content.

The use of these supports is routine in the art.

The propylene-ethylene random copolymer can be produced in a single polymerization step comprising a single polymerization reactor (R1) or in a sequential polymerization process comprising at least two polymerization reactors (R1) and (R2), whereby in the first polymerization reactor (R1) a first fraction (RACO-1) is produced, which is subsequently transferred into the second polymerization reactor (R2). In the second polymerization reactor (R2) a second fraction (RACO-2) is produced in the presence of the first fraction (RACO-1).

Polymerization processes which are suitable for producing the propylene-ethylene random copolymer generally comprises one or two polymerization stages and each stage can be carried out in solution, slurry, fluidized bed, bulk or gas phase.

The term "polymerization reactor" shall indicate that the main polymerization takes place. Thus in case the process consists of one or two polymerization reactors, this definition does not exclude the option that the overall system comprises for instance a pre-polymerization step in a pre-polymerization reactor. The term "consist of" is only a closing formulation in view of the main polymerization reactors.

The term "sequential polymerization process" indicates that the propylene-ethylene random copolymer is produced in at least two reactors connected in series. Accordingly, such a polymerization system comprises at least a first polymerization reactor (R1) and a second polymerization reactor (R2), and optionally a third polymerization reactor (R3).

A preferred multistage process is a "loop-gas phase"-process, such as developed by Borealis (known as BORSTAR® technology) described e.g. in patent literature, such as in EP 0 887 379, WO 92/12182, WO 2004/000899, WO 2004/111095, WO 99/24478, WO 99/24479 or in WO 00/68315.

A further suitable slurry-gas phase process is the Spheripol® process of Basell.

The propylene-ethylene random copolymer in any of its embodiments comprising two fractions (RACO-1) and (RACO-2) is preferably produced in a process comprising the following steps:

a) polymerizing in a first reactor (R1) propylene and ethylene, obtaining polymer fraction (RACO-1), b) transferring said polymer fraction (RACO-1) and unreacted comonomers of the first reactor in a second reactor (R2),
c) feeding to said second reactor (R2) propylene and ethylene,
d) polymerizing in said second reactor (R2) and in the presence of said polymer fraction (RACO-1) propylene and ethylene to obtain polymer fraction (RACO-2) in an intimate mixture with (RACO-1) and hence the final propylene-ethylene random copolymer, whereby preferably the polymerization takes place in the presence of a metallocene catalyst system in any one of the embodiments as described herein.

The propylene-ethylene random copolymer may comprise one or more usual additives, preferably in a total amount of from 0.01 up to 5.0 wt %, more preferably from 0.05 to 3.0 wt % based on the total weight of the propylene-ethylene random copolymer, selected from the group consisting of slip agents, anti-block agents, UV stabilizers, antistatic agents, alpha-nucleating agents, antioxidants and mixtures thereof. Preferably, at least an antioxidant is added to the propylene-ethylene random copolymer of the invention.

According to the present invention, the multilayer film comprises furthermore a core layer (CL), which is a polypropylene-based layer.

Suitable polypropylene polymers are propylene homopolymers or propylene random copolymers.

Preferably, propylene homopolymers are used.

The Propylene Homopolymer (H-PP)

In an embodiment of the present invention, the core layer (CL) comprises a propylene homopolymer (H-PP). More preferably, the core layer (CL) consists of a propylene homopolymer (H-PP).

The expression "propylene homopolymer" used in the instant invention relates to a polypropylene that consists substantially, i.e. of more than 98.0 wt % of, preferably of more than 99.0 wt %, even more preferably of more than 99.5 wt %, still more preferably of at least 99.8 wt %, of propylene units. In a preferred embodiment, only propylene units in the propylene homopolymer (HPP) are detectable.

Accordingly, it is preferred that the propylene homopolymer (H-PP) has a xylene soluble content (XCS) as determined according to ISO 16152 of below 5.0 wt %, more preferably below 4.0 wt %, still more preferably below 3.5 wt %.

It is preferred that the propylene homopolymer (H-PP) is featured by a high isotacticity.

Accordingly, it is preferred that the propylene homopolymer (H-PP) has a mmmm pentad concentration of ≥85.0%, preferably in the range of from 85.0 to 98.0% determined by NMR-spectroscopy, and/or 2,1 erythro regio-defects of below 1.0%, preferably below 0.5%, more preferably below 0.3% determined by $^{13}$C-NMR spectroscopy.

A suitable lower limit is 0.0% for Ziegler-Natta catalysed propylene homopolymers and 0.05% for metallocene catalysed propylene homopolymers.

It is especially preferred that the propylene homopolymer (H-PP) has a weight average molecular weight Mw in the range of 260 to 1000 kg/mol, preferably in the range of 300 to 700 kg/mol, still more preferably in the range of 380 to 650 kg/mol.

Further, it is preferred that the propylene homopolymer (H-PP) has a rather broad molecular weight distribution (Mw/Mn). Accordingly, it is preferred that the molecular weight distribution (Mw/Mn) of the propylene homopolymer (H-PP) is in the range of 3.5 to 10.0, more preferably in the range of 4.0 to 8.5, like in the range of 4.5 to 7.5.

Additionally, it is preferred that the propylene homopolymer (H-PP) has a very low melt flow rate. Accordingly, the melt flow rate (2.16 kg, 230° C.) measured according to ISO 1133 of the propylene homopolymer (H-PP) is preferably in the range of 0.1 to 15.0 g/10 min, more preferably in the range of 1.5 to 10.0 g/10 min, still more preferably in the range of 2.5 to 4.0 g/10 min.

In a preferred embodiment, the propylene homopolymer (H-PP) is thermomechanically stable. Accordingly, it is preferred that the propylene homopolymer (H-PP) has a melting temperature Tm of at least 145° C., more preferably at least 150° C., still more preferably at least 160° C. A reasonable upper limit for Tm is 170° C.

Preferably, the propylene homopolymer (H-PP) according to the present invention is a propylene homopolymer known in the art.

In particular, it is preferred that the propylene homopolymer (H-PP) is the commercial propylene homopolymer HC101BF of Borealis AG.

Film Structure

According to the present invention, the multilayer film comprises at least a first and the second outer layers (OL1) and (OL2) and a core layer (CL).

The outer layers (OL1) and (OL2) of the multilayer film according to the present invention act as sealing layers.

The term "sealing layer" is understood herein as used in the technical field of packaging, i.e. the term "sealing layer" indicates that said layer can be used for sealing purposes, i.e. on the surface of this layer or part of this layer the sealing can take place.

In one preferred embodiment the multilayer biaxially oriented film comprises at least three layers, namely at least one core layer (CL), and two sealing, respectively outer layers (OL1 and OL2), namely a first sealing, respectively outer layer (OL1) and a second sealing, respectively outer layer (OL2), wherein the multilayer biaxially oriented polymer film has the stacking order first sealing, respectively outer layer (OL1)-core layer (CL)-second sealing, respectively outer layer (OL2).

The first sealing, respectively outer layer (OL1) and second sealing, respectively outer layer (OL2) can be chemically different, i.e. can be a different propylene-ethylene random copolymer as described above, or identical, i.e. the same propylene-ethylene random copolymer, the latter being preferred.

The films according to the present invention may further comprise one or two tie layers (TL1) and (TL2). The optional tie layers are located between the core layer (CL) and one or both of the outer layers (OL1) and/or (OL2).

A possible film structure therefore is OL1/TL1/CL/TL2/OL2.

In an embodiment the tie layers (TL1) and (TL2) are made of a polypropylene based polymer, preferably of the same propylene based polymer.

Suitable polypropylene based polymers are as defined above for the core layer (CL).

In a preferred embodiment, the tie layers (TL1) and (TL2) are made of the same polypropylene polymer as the core layer (CL), more preferably the same propylene homopolymer (H-PP).

Preferably, the multilayer biaxially oriented polymer film is obtained by coextrusion. The coextrusion can be accomplished on a blown film line or on a cast film line, the latter being preferred. After coextrusion the multilayer oriented polymer film is biaxially stretched.

Conventional film production techniques may be used for the production of the multilayer film according to the present invention. Typically, the film layers are coextruded in manner as known in the art and then oriented to yield the biaxially oriented (BOPP) multilayer film.

Thus, after coextrusion of the layers, the so obtained multilayer films are oriented in machine direction (MDO) as well as in transverse direction (TDO).

In case the multilayer biaxially oriented polymer film is produced by cast film technology the molten polymers are extruded through flat extrusion die onto a chill roll to cool the polymer to a solid film of at least three layers.

For the production of the multilayer biaxially oriented polymer film the process is carried out by coextruding the melts of the polymer for the core layer (CL), of the propylene-ethylene random copolymer for the outer layers (OL1 and OL2) and optionally of the polymer for the tie layers (TL1 and/or TL2), corresponding to the individual layers of the multilayer biaxially oriented polymer film through flat-film multilayer die, taking off the resultant polymer film over one or more rolls for solidification. As it is conventional in the coextrusion process, the polymer of each respective individual layer is firstly compressed and liquefied in an extruder, it being possible for any additives to be already added to the polymer or introduced at this stage via a masterbatch. The melts are then forced simultaneously through a flat-film die (slot die), and the extruded multilayer polymer film is taken off on one or more take-off rolls, during which it cools and solidifies.

It has proven particularly favorable to keep the take-off roll or rolls, by means of which the extruded film is cooled and solidified. Orientation may be accomplished by stretching or pulling the film first in the machine direction (MD) followed by transverse direction (TD) orientation, like in the tenter-frame orientation process. Orientation may be sequential or simultaneous, depending upon the desired film features. Preferred orientation ratios are commonly from between three to six in the machine direction and between four to ten in the transverse direction.

Thus, in the BOPP film the layers may have the following thicknesses:

Each outer layer: 0.3 μm to 3.0 μm, preferably 0.5 μm to 2.0 μm, more preferably 0.8 μm to 1.5 μm.

Preferably, both outer layers have the same thickness.

Core layer: 5 μm to 40 μm, preferably 10 μm to 35 μm, more preferably 15 μm to 25 μm.

Each tie layers: 1.0 μm to 5 μm, preferably 1.5 μm to 4.5 μm, more preferably 2.0 μm to 4.50 μm.

Preferably, both tie layers have the same thickness.

The total thickness of the BOPP film is 8 μm to 80 μm, preferably 10 μm to 60 μm, more preferably 15 μm to 40 μm.

The thickness of a film layer can be determined, as known in the art, by microscopic techniques, such as optical microscopy or electronic microscopy. As an example, a thin slice of the film is cut perpendicularly to the plane of the film using a microtome blade as follows. The film is cooled in liquid nitrogen in a microtome holder. Then a microtome blade cuts several slices from about 10 to 15 microns in thickness. These slices are then observed with an optical microscope, and an image is projected therefrom. A software program, as known in the art, can be used to measure the thickness of each layer as shown on the projected image. Measurements can be made at different points on the image, and then an average can be determined. The film layers are clearly distinguishable by their different contrasts.

Optionally one or both, surface (s) of the multi-layer biaxially oriented polymer film can be corona- or flame-treated by one of the known methods. For the corona treatment, the film is passed between two conductor elements serving as electrodes, with such a high voltage, usually an alternating voltage (about 10000 V and 10000 5 Hz), being applied between the electrodes that spray or corona discharges can occur. Due to the spray or corona discharge, the air above the film surface is ionized and reacts with the molecules of the film surface, causing formation of polar inclusions in the essentially non-polar polymer matrix. The treatment intensities are in the usual range, preferably from 38 to 45 dynes/cm after production.

The biaxially oriented polypropylene-based multilayer film according to the present invention is characterized by a sealing initiation temperature determined as described in the experimental part on a BOPP film with a thickness of 25 μm of below 115° C., preferably in the range of 80 to 112° C., more preferably in the range of 90° C. to 110° C., like 95° C. to 107° C.

In an embodiment, the biaxially oriented polypropylene-based multilayer film is additionally characterized by a seal strength@110° C. determined on a BOPP film as described in the experimental part of at least 1.50 up to 5.00 N/25 mm, preferably 2.00 N/25 mm to 4.00 N/25 mm and more preferably 2.45 N/25 mm to 3.50 N/25 mm, whereby "Seal strength @110° C." is the seal strength achieved, if the film is sealed at 110° C.

In another embodiment, the biaxially oriented polypropylene-based multilayer film may have a haze (measured on a BOPP film with a thickness of 25 μm according to ASTM D 1003-00) of below 5%, preferably between 0.2% and 3.0%, more preferable between 0.5% and 1.5%.

Thus, in a preferred embodiment, the biaxially oriented polypropylene-based multilayer film is characterized by having at least a) a sealing initiation temperature sealing initiation temperature determined as described in the experimental part on a BOPP film with a thickness of 25 μm of below 115° C., preferably in the range of 80 to 112° C., more preferably in the range of 90° C. to 110° C., like 95° C. to 107° C., and one or both of the following properties b) and c)

b) a seal strength@110° C. determined on a BOPP film as described in the experimental part of at least 1.50 up to 5.00 N/25 mm, preferably 2.00 N/25 mm to 4.00 N/25 mm and more preferably 2.45 N/25 mm to 3.50 N/25 mm, c) a haze (measured on a BOPP film with a thickness of 25 μm according to ASTM D 1003-00) of below 5%, preferably between 0.2% and 3.0%, more preferable between 0.5% and 1.5%.

The inventive multilayer biaxially oriented polymer film is fully recyclable and thus improves sustainability, as it is a "100% PP" solution with no other polymer than propylene-based polymers being present.

Furthermore, the present invention is also directed to the use of the inventive multilayer biaxially oriented polymer film as packing material, in particular as a packing material for food and/or non-food products like textiles, flowers, pet food, detergents and protective films for cardboard boxes containing tobacco product or perfumes.

The invention will be further described with reference to the following non-limiting examples.

Experimental Part

Measuring Methods

The following definitions of terms and determination methods apply for the above general description of the invention as well as to the below examples unless otherwise defined.

Melt Flow Rate

The melt flow rate (MFR) was determined according to ISO 1133—Determination of the melt mass-flow rate (MFR) and melt volume-flow rate (MVR) of thermoplastics Part 1: Standard method and is indicated in g/10 min. The MFR is an indication of the flowability, and hence the processability, of the polymer. The higher the melt flow rate, the lower the viscosity of the polymer. The $MFR_2$ of polypropylene is determined at a temperature of 230° C. and a load of 2.16 kg.

Comonomer Content of the Second Polymer Fraction (RACO-2)

The comonomer content of the second polymer faction (RACO-2) is calculated according to formula (I).

$$\frac{C(A) - w(A1)x\,C(A1)}{w(A2)} = C(A2) \tag{I}$$

wherein w(A-1) is the weight fraction [in wt %] of the first polymer fraction (RACO-1), w(A-2) is the weight fraction [in wt %] of second polymer fraction (RACO-2), C(A-1) is the comonomer content [in wt %] of the first polymer fraction (RACO-1), C(A) is the comonomer content [in wt %] of the $C_3C_2$ random copolymer (RACO), C(A-2) is the calculated comonomer content [wt %] of the second polymer fraction (RACO-2).

Calculation of Melt Flow Rate $MFR_2$ of the Polymer Fraction (RACO-2)

The MFR of the second polymer faction (RACO-2) is calculated according to formula (II).

$$MFR(A2) = 10\left[\frac{\log(MFR(A)) - w(A1)x\log(MFR(A1))}{w(A2)}\right] \tag{II}$$

wherein w(A1) is the weight fraction [in wt %] of the polymer fraction RACO-1, w(A2) is the weight fraction [in wt %] of the polymer fraction RACO-2, MFR(A1) is the melt flow rate $MFR_2$ (230° C.) [g/10 min] of the polymer fraction RACO-1, MFR(A) is the melt flow rate $MFR_2$ (230° C.) [g/10 min] of the entire random propylene copolymer (RACO), MFR(A2) is the calculated melt flow rate $MFR_2$ (230° C.) [g/10 min] of the polymer fraction RACO-2.

Quantification of Microstructure by NMR Spectroscopy (Comonomer Content & Regiodefects)

Quantitative nuclear-magnetic resonance (NMR) spectroscopy was further used to quantify the comonomer content and comonomer sequence distribution of the polymers. Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimized 10 mm extended temperature probe head at 125° C. using nitrogen gas for all pneumatics. Approximately 200 mg of material was dissolved in 3 ml of 1,2-tetrachloroethane-d 2 (TCE-d 2) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimized tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6k) transients were acquired per spectra.

Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E = 0.5(S\beta\beta + S\beta\gamma + 0.5(S\alpha\beta + S\alpha\gamma))$$

Through the use of this set of sites the corresponding integral equation becomes:

$$E = 0.5(I_H + I_G + 0.5(I_C + I_D))$$

using the same notation used in the article of Wang et. al. (Wang, W J., Zhu, S., Macromolecules 33 (2000), 1157). Equations used for absolute propylene content were not modified.

The mole percent comonomer incorporation was calculated from the mole fraction:

$$E \,[\text{mol \%}] = 100 * fE$$

The weight percent comonomer incorporation was calculated from the mole fraction:

$$E \,[\text{wt \%}] = 100 * (fE * 28.06)/((fE * 28.06) + ((1 - fE) * 42.08))$$

The comonomer sequence distribution at the triad level was determined using the analysis method of Kakugo et al. (Kakugo, M., Naito, Y., Mizunuma, K., Miyatake, T. Macromolecules (1982) 1150). This method was chosen for its robust nature and integration regions slightly adjusted to increase applicability to a wider range of comonomer contents.

Xylene Solubles (XCS, wt %)

The xylene soluble (XCS) fraction as defined and described in the present invention was determined in line with ISO 16152 as follows: 2.0 g of the polymer were dissolved in 250 ml p-xylene at 135° C. under agitation. After 30 minutes, the solution was allowed to cool for 15 minutes at ambient temperature and then allowed to settle for 30 minutes at 25+/−0.5° C. The solution was filtered with filter paper into two 100 ml flasks. The solution from the first 100 ml vessel was evaporated in nitrogen flow and the residue dried under vacuum at 90° C. until constant weight is reached. The xylene soluble fraction (percent) can then be determined as follows:

$$XCS\%=(100*m*V0)/(m0*v)$$

m0=initial polymer amount (g);
m=weight of residue (g);
V0=initial volume (ml);
v=volume of analysed sample (ml).

DSC Analysis, Melting (Tm) and Crystallization Temperature (Tc)

Data were measured with a TA Instrument Q2000 differential scanning calorimetry (DSC) on 5 to 7 mg samples. DSC was run according to ISO 11357/part 3/method C2 in a heat/cool/heat cycle with a scan rate of 10° C./min in the temperature range of −30 to +225° C.

Crystallization temperature ($T_c$) and crystallization enthalpy ($H_c$) were determined from the cooling step, while melting temperature ($T_m$) and melting enthalpy ($H_m$) are determined from the second heating step.

Hexane Extractables

The hexane extractable fraction is determined according to FDA method (federal registration, title 21, Chapter 1, part 177, section 1520, s. Annex B) on cast films of 100 μm thickness produced on a monolayer cast film line with a melt temperature of 220° C. and a chill roll temperature of 40° C. The extraction was performed at a temperature of 50° C. and an extraction time of 30 min.

Sealing Behavior

Sealing Initiation Temperature (SIT); Sealing End Temperature (SET), Sealing Range:

The method determines the sealing temperature range (sealing range) of polyethylene films, in particular blown films or cast films. The sealing temperature range is the temperature range, in which the films can be sealed according to conditions given below.

The lower limit (heat sealing initiation temperature (SIT)) is the sealing temperature at which a sealing strength of >5 N is achieved. The upper limit (sealing end temperature (SET)) is reached, when the films stick to the sealing device.

The sealing range was determined on a J&B Universal Sealing Machine Type 4000 with a BOPP film of 25 μm thickness with the following further parameters:

Specimen width: 25.4 mm
Seal Pressure: 0.1 N/mm2
Seal Time: 0.1 sec
Cool time: 99 sec
Peel Speed: 10 mm/sec
Start temperature: 80° C.
End temperature: burn through
Increments: 5° C.
Seal Strength@110° C.

The heat-seal experiments were performed on at least 3 film specimens of 85 mm wide by 200 mm length cut in the machine direction. The 5 mm×150 mm Teflon coated steel heating bars were set to a temperature of 110° C. Two films were sealed by positioning, one on top of the other using a 0.5 s sealing time and 0.67 N/mm$^2$ pressure. The resulting sealed area was 85 mm×5 mm. The specimens were then conditioned for 7 days (±24 h) at 23° C. (±2° C.)/50% RH (±10%). 10 specimens of 15 mm width were cut and tested in tensile mode at 23° C. (±2° C.)/50% RH (±10%) on a Universal Testing Machine (Zwick Z005). The clamping distance used was 100 mm, and a test speed of 200 mm/min. The yielding force and maximum force were measured for each test specimen.

Basic Sealing:

Film width: 85 mm
Film length: >200 mm
Sealed seam width: 5 mm
Sealing temperature: 110° C.
Sealing pressure: 0.67 N/mm$^2$
Sealing time: 0.5 s
Sealing jaws: Teflon coated Conditioning Conditioning time: 7 days (±24 h) at 23° C. (±2° C.)/50% RH (±10%)

Heat Seal Strength:

Test temperature: 23° C. (±2° C.)/50% RH (±10%)
Specimen width: 15 mm
Gripping distance: 100 mm
Test speed: 200 mm/min
Test device: Universal Testing Machine Haze Haze was determined on the biaxially oriented multilayered films prepared as described below according to ASTM D1003-00.

2. Examples

Propylene-ethylene Random Copolymer Preparation

Catalyst: Synthesis of Metallocene

The metallocene complex (Metallocene MC-2) has been produced as described in WO2019/179959 for MC-2.

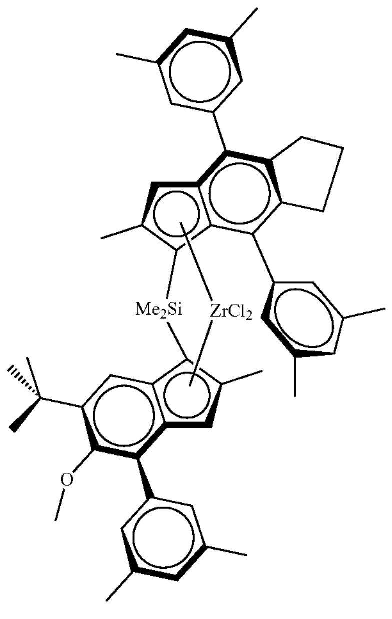

Preparation of MAO-silica Support

A steel reactor equipped with a mechanical stirrer and a filter net was flushed with nitrogen and the reactor temperature was set to 20° C. Next silica grade DM-L-303 from AGC Si-Tech Co, pre-calcined at 600° C. (5.0 kg) was added from a feeding drum followed by careful pressuring and depressurising with nitrogen using manual valves. Then toluene (22 kg) was added. The mixture was stirred for 15 min. Next 30 wt. % solution of MAO in toluene (9.0 kg) from Lanxess was added via feed line on the top of the reactor within 70 min. The reaction mixture was then heated up to 90° C. and stirred at 90° C. for additional two hours. The slurry was allowed to settle and the mother liquor was filtered off. The catalyst was washed twice with toluene (22 kg) at 90° C., following by settling and filtration. The reactor was cooled off to 60° C. and the solid was washed with heptane (22.2 kg). Finally MAO treated SiO2 was dried at 60° under nitrogen flow for 2 hours and then for 5 hours under vacuum (−0.5 barg) with stirring. MAO treated support was collected as a free-flowing white powder found to contain 12.2% Al by weight.

Inventive Catalyst System 1 (ICS1) Catalyst Preparation 30 wt % MAO in toluene (0.7 kg) was added into a steel nitrogen blanked reactor via a burette at 20° C. Toluene (5.4 kg) was then added under stirring. Metallocene MC-2 (93 g) was added from a metal cylinder followed by flushing with 1 kg toluene. The mixture was stirred for 60 minutes at 20° C. Trityl tetrakis(pentafluorophenyl) borate (91 g) was then added from a metal cylinder followed by a flush with 1 kg of toluene. The mixture was stirred for 1 h at room temperature. The resulting solution was added to a stirred cake of MAO-silica support prepared as described above over 1 hour. The cake was allowed to stay for 12 hours, foiled by drying under N2 flow at 60° C. for 2 h and additionally for 5 h under vacuum (−0.5 barg) under stirring.

Dried catalyst was sampled in the form of pink free flowing powder containing 13.9% Al and 0.11% Zr.

The polymerization for preparing the propylene-ethylene random copolymer (C3C2 copo) was performed in a Borstar pilot plant with a 2-reactor set-up (loop-gas phase reactor (GPR 1)) and a pre-polymerizer, using the catalyst system as described above.

In Table 1, the polymerization conditions for inventive $C_3C_2$ copo and the final properties of the resins are given.

TABLE 1

Polymerization conditions and final properties of inventive $C_3C_2$ copo (IE1):

| | | $C_3C_2$ copo (IE1) |
|---|---|---|
| Prepolymerizer | | |
| Temperature | ° C. | 20 |
| Pressure | kPa | 4982 |
| Loop | | |
| Temperature | ° C. | 70 |
| Pressure | kPa | 4875 |
| Feed H2/C3 | mol/kmol | 0.22 |
| Feed C2/C3 | mol/kmol | 43.54 |
| Split | wt % | 60 |
| C2 (of RACO-1) | wt % | 2.9 |
| MFR (of RACO-1) | g/10 min | 5.4 |
| GPR1 | | |
| Temperature | ° C. | 80 |
| H2/C3 | mol/kmol | 3.5 |
| C2/C3 | mol/kmol | 155 |
| Split | wt % | 40 |
| C2 of GPR polymer (RACO-2) | wt % | 5.2 |
| MFR2 of GPR polymer (RACO-2) | | 4.7 |
| Final polymer (pellets) | | |
| MFR | g/10 min | 5.1 |
| C2 | wt % | 3.8 |
| XCS | wt % | 0.81 |
| Tm | ° C. | 127 |
| Tc | ° C. | 92 |
| 2.1 + 3.1 regio defects | mol % | 0.42 |
| C6 FDA | wt % | 0.77 |

The polymer powder was compounded in a co-rotating twin-screw extruder Coperion ZSK 70 at 220° C. with 0.1 wt % antiblock agent (synthetic silica; CAS-no. 7631-86-9); 0.1 wt % antioxidant (Irgafos 168FF); 0.05 wt % of a sterically hindered phenol (Irganox 1010FF); and 0.04 wt % (each based on the total weight of the polymer) of Synthetic hydrotalcite (CAS-no. 11097-59-9).

For the comparative Example 1 (CE1) a "trimodal" $C_3C_2$ copolymer was produced in a Borstar pilot plant with a 3-reactor set-up (loop-gas phase reactor (GPR 1)-gas phase reactor (GPR 2)) and a pre-polymerizer, using the catalyst system as described above. Additivation was done as described above.

TABLE 2

Polymerization conditions and final properties of the trimodal $C_3C_2$ copo for CE1:

| | | trimodal $C_3C_2$ copo (CE1) |
|---|---|---|
| Prepolymerizer | | |
| Temperature | ° C. | 20 |
| Pressure | kPa | 4858 |
| Loop | | |
| Temperature | ° C. | 65 |
| Pressure | kPa | 4837 |
| Feed H2/C3 | mol/kmol | 0.08 |
| Feed C2/C3 | mol/kmol | 17.38 |
| Split | wt % | 45 |
| C2 | wt % | 1.0 |
| MFR | g/10min | 2.0 |
| GPR1 | | |
| Temperature | ° C. | 75 |
| H2/C3 | mol/kmol | 1.8 |
| C2/C3 | mol/kmol | 76.5 |
| Split | wt % | 40 |
| C2 after GPR1 | wt % | 1.7 |
| $MFR_2$ after GPR1 | g/10 min | 2.0 |
| GPR2 | | |
| Temperature | ° C. | 70 |
| H2/C3 | mol/kmol | 4 |
| C2/C3 | mol/kmol | 515 |
| Split | wt % | 15 |
| C2 after GPR2 | wt % | 4.0 |
| Final polymer (pellets) | | |
| MFR | g/10 min | 1.9 |
| C2 | wt % | 3.9 |
| XCS | wt % | 15.8 |

TABLE 2-continued

| Polymerization conditions and final properties of the trimodal $C_3C_2$ copo for CE1: | | |
|---|---|---|
| | | trimodal $C_3C_2$ copo (CE1) |
| Tm | | 140 |
| Tc | ° C. | 102 |
| 2.1 + 3.1 | mol % | 0.54 |
| C6 FDA | wt % | 1.04 |

Multilayer BOPP Film

Inventive Biaxially Oriented Multilayer Film (IE1)

For the core layer (CL) and the tie layers (TL1 and TL2) the commercial product HC101BF of Borealis AG which is a homopolymer having an $MFR_2$ (230° C.) of 3.2 g/10 min has been used.

For the outer layer (OL1) the above produced $C_3C_2$ copo was used

For the outer layer (OL2) a blend of 2 wt % of the antiblock agent Seablock 4 from Ampacet and 98 wt % of the above produced $C_3C_2$ copo was used.

Multilayer BOPP film was produced on a BOPP pilot line.

The film structure was OL1/TL1/CL1/TL2/OL2

| Caster | Corona |
|---|---|
| Coex 1 (OL1) | 100 wt % C3C2 copo |
| Coex 3 (TL1) | 100 wt % HC101BF |
| Main (CL) | 100 wt % HC101BF |
| Coex 4 (TL2) | 100 wt % HC101BF |
| Coex 2 (OL2) | 98 wt % C3C2 copo + 2 wt % Seablock 4 |

Air Knife

In order to produce the BOPP film mentioned above, first a film was produced with co-extrusion of 5 layers operated with 5 extruders. Extrusion condition are shown in Table 3. The cast roll had a temperature of 35° C. and the water batch temperature was 30° C.

TABLE 3

| Production condition for the film of IE1: | | | | | | |
|---|---|---|---|---|---|---|
| Extruder | | Main | Coex 1 | Coex 2 | Coex 3 | Coex 4 |
| Layer | | CL | OL1 | OL2 | TL1 | TL2 |
| Resin | | HC101BF | $C_3C_2$ copo | $C_3C_2$ copo + Seablock | HC101BF | HC101BF |
| Barrel temp | ° C. | 250 | 240 | 240 | 240 | 240 |
| Melt temp | ° C. | 248 | 252 | 254 | 249 | 251 |
| Output | kg/h | 150 | 7.6 | 7.6 | 28.8 | 29.4 |

Afterwards biaxially orientation was done:

Machine Direction Stretching (MDO)

MD stretching ratio=4.7 (in 1 step—1st fast roll in contact with the bath side skin)

MDO rolls temperature: preheat 120° C./stretch 118° C./annealing 120° C.

Transverse Direction Stretching (TDO)

TD stretching ratio=8.8

TDO oven temperature: preheat 183-180-175° C./stretch 158-158° C./annealing 162-162° C.

TDO rail width: 195-195-195-195/850-1500/1450-1400-1395 mm

Treatment

Top corona on caster skin: 2.4 kW equivalent to 25.0 $Wmin/m^2$

The film structure after biaxial orientations for IE1 was:

| Layer | Final thickness |
|---|---|
| Coex 1 (OL1) | 1 μm |
| Coex 3 (TL1) | 3.0 μm |
| Main (CL) | 17.0 μm |
| Coex 4 (TL2) | 3.0 μm |
| Coex 2 (OL2) | 1 μm |

Comparative Biaxially Oriented Multilayer Films CE1 and CE2

For CE1, the above prepared trimodal $C_3C_2$ copolymer was used.

For CE2 TD310BF, a $C_2C_3C_4$ terpolymer produced with a Ziegler-Natta catalyst, commercially available from Borealis. was used.

The preparation of the biaxially oriented multilayer film was done as described above for the Inventive film structure, except that for the outer layers (OL1 and OL2) either the trimodal $C_3C_2$ copolymer (CE1) or TD310BF (CE2) was used.

In Table 4 the film properties of the inventive film structure as well as for the comparative films are shown.

TABLE 4

| film properties: | | | | |
|---|---|---|---|---|
| | | CE2 | CE1 | IE1 |
| Seal layer | | TD310BF ZN $C_2C_3C_4$ | Trimodal $C_3C_2$ SSc $C_3C_2$ | $C_3C_2$ copo SSc $C_3C_2$ |

TABLE 4-continued

| film properties: | | | | |
|---|---|---|---|---|
| | | CE2 | CE1 | IE1 |
| SIT | ° C. | 108 | 118 | 106 |
| Haze | % | 1.7 | 1.8 | 1.2 |
| Seal strength@110° C. | N | 2.39 | n.d .* | 2.53 |

*The force was below the detect limit.

As can be seen, the IE has generally improved properties as lower haze and better sealing properties (i.e. lower SIT and at least slightly higher seal strength).

The invention claimed is:

1. A biaxially oriented polypropylene-based multilayer film comprising at least a core layer (CL), a first outer layer (OL1) and a second outer layer (OL2), wherein the first and the second outer layers (OL1) and (OL2) consist of a metallocene produced propylene-ethylene random copolymer having a melt flow rate $MFR_2$ (230° C./2.16 kg) measured according to ISO 1133 in the range from 2 to 10 g/10 min;

a melting temperature $T_m$ as determined by DSC according to ISO 11357 in the range from 115 to 135° C.; and an ethylene content as measured by quantitative $^{13}C\{^1H\}$ NMR in the range from 2.0 to 5.0 wt % based on the weight of the propylene-ethylene random copolymer;

a number of 2,1 and 3,1 regio defects as measured by $^{13}C$-NMR in the range from 0.10 to 1.0 mol %;

wherein the core layer (CL) is a polypropylene-based polymer layer; and wherein the biaxially oriented polypropylene-based multilayer film has a sealing initiation temperature (SIT), determined as described in the experimental part on a BOPP film with a thickness of 25 μm, of 95° C. to 107° C.; a haze, measured on a BOPP film with a thickness of 25 μm according to ATSM D 1003-00, of between 0.5% to 1.5%; and exhibits a seal strength at 110° C. of at least 1.50 N/25 mm, and wherein the metallocene produced propylene-ethylene random copolymer is produced by a loop-gas phase sequential polymerization process using a metallocene catalyst.

2. The biaxially oriented polypropylene-based multilayer film according to claim 1, wherein the propylene-ethylene random copolymer is furthermore characterized by a xylene cold soluble (XCS) fraction as determined according to ISO 16152 of from 0.1 to below 15.0 wt %, based on the weight of the propylene-ethylene random copolymer.

3. The biaxially oriented polypropylene-based multilayer film according to claim 1, wherein the propylene-ethylene random copolymer comprises two polymer fractions (RACO-1) and (RACO-2) and the split between fractions (RACO-1) and (RACO-2) is from 30:70 to 70:30.

4. The biaxially oriented polypropylene-based multilayer film according to claim 3, wherein the fraction (RACO-1) of the propylene-ethylene random copolymer has an ethylene content in the range of 1.5 to 5.5 wt %.

5. The biaxially oriented polypropylene-based multilayer film according to claim 1, wherein the propylene-ethylene random copolymer additionally has the following characteristic:

a hexane extractables content as measured according to the FDA method of less than 2.0 wt %.

6. The biaxially oriented polypropylene-based multilayer film according to claim 1, wherein the core layer (CL) comprises propylene homopolymer (H-PP).

7. The biaxially oriented polypropylene-based multilayer film according to claim 6, wherein the propylene homopolymer (H-PP) is characterized by a xylene soluble content (XCS) as determined according to ISO 16152 of below 5.0 wt %.

8. The biaxially oriented polypropylene-based multilayer film according to claim 1, wherein the film further comprises one or two tie layers (TL1) and (TL2), wherein the tie layers are located between the core layer (CL) and one or both of the outer layers (OL1) and/or (OL2).

9. The biaxially oriented polypropylene-based multilayer film according to claim 8, wherein the tie layers (TL1) and (TL2) are made of a polypropylene-based polymer.

10. The biaxially oriented polypropylene-based multilayer film according to claim 1, wherein the thickness of the layers after biaxial orientation is for each outer layer: 0.3 μm to 3.0 μm;

the core layer: 5 μm to 40 μm; and each tie layers: 1.0 μm to 5 μm and wherein the total thickness of the BOPP film is 8 μm to 80 μm.

11. The biaxially oriented polypropylene-based multilayer film according to claim 1, wherein the film is characterized by a seal strength@110° C. determined on a BOPP film as described in the experimental part of at least 1.50 up to 5.00 N/25 mm.

12. A packing material and protective films for cardboard boxes containing tobacco product or perfumes comprising the biaxially oriented polypropylene-based multilayer film according to claim 1.

13. The biaxially oriented polypropylene-based multilayer film according to claim 3, wherein the fraction (RACO-2) has an ethylene content in the range of 3.0 to 8.0 wt %.

14. The biaxially oriented polypropylene-based multilayer film according to claim 3, wherein the fraction (RACO-1) has a melt flow rate $MFR_2$ (230° C./2.16 kg) measured according to ISO 1133 in the range of from 2.5 to 15.0 g/10 min.

15. The biaxially oriented polypropylene-based multilayer film according to claim 3, wherein the fraction (RACO-2) has a melt flow rate $MFR_2$ (230° C./2.16 kg) measured according to ISO 1133 in the range of from 2.0 to 12.0 g/10 min.

16. The biaxially oriented polypropylene-based multilayer film according to claim 6, wherein the propylene homopolymer (H-PP) is characterized by a melting temperature Tm of at least 145° C.

17. The biaxially oriented polypropylene-based multilayer film according to claim 9, wherein the polypropylene-based polymer of the tie layers (TL1) and (TL2) is the same as the polypropylene-based layer of the core layer (CL).

* * * * *